United States Patent [19]

Leising

[11] Patent Number: 4,528,322

[45] Date of Patent: Jul. 9, 1985

[54] AQUEOUS CATIONIC DISPERSIONS OF SYNTHETIC POLYMERS

[75] Inventor: Frederic Leising, Vaujours, France

[73] Assignee: Rhone-Poulenc Specialites Chimiques, France

[21] Appl. No.: 573,723

[22] Filed: Jan. 25, 1984

[30] Foreign Application Priority Data

Jan. 28, 1983 [FR] France ............... 83 01301

[51] Int. Cl.$^3$ ............................................. C08K 5/16
[52] U.S. Cl. ............................................. 524/829
[58] Field of Search .................................. 524/829

[56] References Cited

U.S. PATENT DOCUMENTS

| | | | |
|---|---|---|---|
| 3,253,941 | 5/1966 | Finn et al. | 427/155 |
| 3,321,431 | 5/1967 | McNab et al. | 524/829 |
| 3,399,159 | 8/1968 | Samour | 524/808 |
| 3,637,565 | 1/1972 | Sheetz | 260/29.6 TA |
| 3,808,158 | 4/1974 | Bollo | 260/21 R |
| 4,154,910 | 5/1979 | Tanaka et al. | 524/829 |
| 4,166,882 | 9/1979 | Das et al. | 524/829 |
| 4,314,044 | 2/1982 | Hughes et al. | 524/829 |

FOREIGN PATENT DOCUMENTS 1363278 8/1974 United Kingdom .

*Primary Examiner*—Paul R. Michl
*Assistant Examiner*—N. Sarofim
*Attorney, Agent, or Firm*—Finnegan, Henderson, Farabow, Garrett & Dunner

[57] ABSTRACT

Aqueous cationic dispersions of synthetic polymers obtained by reacting at least one unsaturated tertiary nitrogen compound not capable of being hydrolyzed in an acid or alkaline medium with an aqueous emulsion reaction mixture, containing cationic species, of at least one non-ionic monomer capable of being copolymerized with the nitrogen compound to form synthetic polymers and at least one substance which generates cationic species capable of chemically binding with the said synthetic polymers.

46 Claims, No Drawings

AQUEOUS CATIONIC DISPERSIONS OF SYNTHETIC POLYMERS

FIELD OF THE INVENTION

This invention relates to a process for making aqueous cationic dispersions of synthetic polymers by reacting at least one unsaturated nitrogen compound not capable of being hydrolyzed in an acid or alkaline medium with an aqueous emulsion reaction mixture. The aqueous cationic dispersions produced by the process and the compositions capable of forming the aqueous cationic dispersions are also disclosed.

BACKGROUND OF THE INVENTION

Cationic polymeric compositions have typically been prepared in acidic mediums. For example, U.S. Pat. No. 3,399,159 discloses the preparation of cationic latices by polymerizing, in an acidic medium with a pH between 1 and 3.5, a nitrogen monomer of the vinylpyridine or tert-butylaminoethyl methacrylate type and an alkyl acrylate in the absence of an emulsifier.

Similarly, U.S. Pat. No. 3,253,941 discloses cationic latices obtained by polymerizing, in an acidic medium, an aminoalkyl monomer, such as alkylaminoalkyl acrylates or methacrylates, a monomer of the styrene, vinyltoluene, acrylonitrile, or methyl methacrylate type, and a $C_1$–$C_8$ acrylic ester.

However, the latices obtained from these processes cannot be used in a basic medium, because the cationic charge density is too low when the medium is at a basic pH. In addition, because the polymer particles of the aqueous dispersions of these processes are unstable, a significant percentage of undesirable grains is formed during the polymerization or neutralization of the aqueous dispersion. The presence of these undesirable grains decreases the quality of the dispersions and increases production costs by reducing yield.

Thus, an object of the present invention is to prepare aqueous cationic dispersions of synthetic polymers with less than 500 parts per million (less than about 0.05% by weight of polymer) of undesirable grains and which can be used at any pH.

SUMMARY OF THE INVENTION

The present invention provides a process for making aqueous cationic dispersions of synthetic polymers comprising the steps of providing at least one unsaturated tertiary nitrogen compound not capable of being hydrolyzed in an acid or alkaline medium and reacting the nitrogen compound with an aqueous emulsion reaction mixture, containing cationic species, of at least one non-ionic monomer capable of being copolymerized with the nitrogen compound to form synthetic polymers and at least one substance which generates cationic species capable of chemically binding with the synthetic polymers.

The invention also embodies the aqueous cationic dispersions of synthetic polymers obtained by reacting at least one unsaturated tertiary nitrogen compound not capable of being hydrolyzed in an acid or alkaline medium, with an aqueous emulsion reaction mixture, containing cationic species, of at least one non-ionic monomer capable of being copolymerized with the nitrogen compound to form synthetic polymers and at least one substance which generates cationic species capable of chemically binding with the synthetic polymers.

Further, the invention includes a composition capable of forming aqueous cationic dispersions of synthetic polymers, which comprises at least one unsaturated tertiary nitrogen compound not capable of being hydrolyzed in an acid or alkaline medium with an aqueous emulsion reaction mixture, containing cationic species, of at least one non-ionic monomer capable of being copolymerized with the nitrogen compound to form synthetic polymers and at least one substance which generates cationic species capable of chemically binding with the synthetic polymers.

DETAILED DESCRIPTION OF THE INVENTION

In accordance with the invention and as embodied herein, the aqueous cationic dispersions of synthetic polymers can be prepared by providing at least one unsaturated tertiary nitrogen compound which cannot be hydrolyzed in an acid or alkaline medium. As defined herein, the term "unsaturated tertiary nitrogen compound which cannot be hydrolyzed in an acid or alkaline medium" is any unsaturated nitrogen compound which does not contain a quaternary ammonium group, which does contain a nitrogen atom trisubstituted by hydrocarbon groups, and which has a level of hydrolysis in an acid or alkaline medium not exceeding 5% at the polymerization temperature.

The unsaturated tertiary nitrogen compound is preferably selected from the group consisting of (1) an N-($\omega$-dialkylaminoalkyl)amide of an unsaturated carboxylic acid, having the formula:

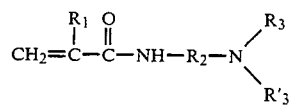

where $R_1$ is a hydrogen atom or a $C_1$–$C_4$ alkyl group, preferably a $C_1$–$C_2$ alkyl group, $R_2$ is a $C_1$–$C_{12}$ alkylene group, preferably a $C_1$–$C_8$ alkylene group and $R_3$ and $R'_3$ represent $C_1$–$C_6$ alkyl groups, preferably $C_1$–$C_4$ alkyl groups, or phenyl radicals which are optionally substituted by a $C_1$–$C_9$ alkyl radical; (2) an unsaturated aminoester having the formula:

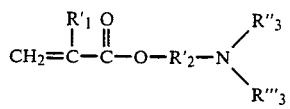

where $R'_1$ is a $C_1$–$C_5$-alkyl group, preferably a $C_1$–$C_2$-alkyl group, $R'_2$ is a linear or branched alkylene group with at least 2 carbon atoms, preferably a $C_2$–$C_{12}$-alkylene group, more preferably a $C_2$–$C_8$-alkylene group, and $R''_3$ and $R'''_3$, which may be identical, are either a $C_1$–$C_6$ alkyl group, preferably a $C_1$–$C_4$ alkyl group, optionally substituted by a hydroxyl radical, or a phenyl group, optionally substituted by $C_1$–$C_9$ alkyl radical, wherein the total number of carbon atoms contained in the radicals $R'_2$, $R''_3$, and $R'''_3$ must be greater than 8; and (3) a heterocyclic nitrogen compound with either a nitrogen or carbon atom substituted by a vinyl group, such as 2-vinylpyridine, 4-vinylpyridine, 1-ethyl-2-vinyl-pyridine, 1-benzyl-4-vinylpyridine, 1,2-dimethyl-5-vinylpyridine, 1-methyl-2-vinylquinoline, N-vinyl-N'-methyl-imidazole and 1-vinyl-3-methylbenzimidazole.

Particularly preferred N-(ω-dialkylaminoalkyl)-amides include dimethylaminomethyl-acrylamide or -methacrylamide and dimethylaminoethyl-acrylamide or -methacrylamide.

Particularly preferred unsaturated aminoesters include di-tert-butylaminoethyl methacrylate, di-tert-butylaminopropyl methacrylate and dipentylaminoethyl methacrylate.

The nitrogen compound is reacted with an aqueous emulsion reaction mixture, containing cationic species. The aqueous emulsion reaction mixture contains at least one non-ionic monomer capable of being copolymerized with the nitrogen compound and at least one substance which generates cationic species capable of chemically binding with the synthetic polymers.

Exemplary non-ionic monomers capable of being copolymerized with the nitrogen compound and which thus may be employed in the claimed invention include vinyl-aromatic compounds, such as styrene, α-methylstyrene, vinyltoluene and monochlorostyrene, vinyl esters, such as vinyl acetate, vinyl propionate, vinyl versatate and vinyl butyrate, ethylenic nitriles, such as acrylonitrile and methacrylonitrile, ethylenic carboxylic esters, such as methyl, ethyl, propyl, isopropyl, butyl, 2-ethylhexyl, hydroxyethyl, hydroxypropyl or glycidyl acrylate, methyl, ethyl, propyl, butyl, hydroxyethyl, hydroxypropyl or glycidyl methacrylate, dialkyl esters of ethylenic dicarboxylic acids, such as dialkyl esters of fumaric acid, maleic acid, and itaconic acid, and ethylenic amides and the N-substituted derivatives of ethylenic amides, such as acrylamide, methacrylamide, N-methylol- and N-methoxymethyl-acrylamide and methacrylamide. These non-ionic monomers may be used individually or, if they are capable of being copolymerized with one another, as a mixture.

The substance which generates cationic species must be either non-hydrolyzable or partially hydrolyzable. A substance which generates cationic species is considered partially hydrolyzable if its level of hydrolysis when polymerized is less than or equal to about 50%.

Examples of typical substances which generate cationic species include (1) polymerization initiators which produce radicals with cationic extremities, such as 2,2'-azobis-(2-amidinopropane) hydrochloride and azo-bis-N,N'-dimethylene-isobutyramidine hydrochloride, (2) unsaturated copolymerizable salts of a polycoordinated onium of a group 5a or 6a element, such as nitrogen, phosphorus or sulfur, capable of being copolymerized with the non-ionic monomer and (3) suitable mixtures thereof.

As defined herein, any salt with an onium cation, in which all of the group 5a or 6a element valences are satisfied by hydrocarbon groupings, at least one of which hydrocarbon groupings is unsaturated and in which the free valency of the group 5a or 6a element is saturated by a carbon atom is considered an "unsaturated salt of a polycoordinated onium of a group 5a or 6a element".

Examples of such unsaturated onium salts are the unsaturated quaternary ammonium salts having the formula:

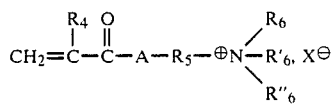

where $X^-$ is: $Cl^-$, $Br^-$, $I^-$, $SO_4H^-$, $SO_4^{--}$, $CH_3SO_4^-$, $C_2H_5SO_4^-$ or $CH_3COO^-$, $R_4$ is a hydrogen atom or an methyl group, A is an oxygen atom or a —NH— group, $R_5$ is a linear or branched alkylene group with 1 to 18 carbon atoms, preferably 1 to 10 carbon atoms, and $R_6$, $R'_6$ and $R''_6$, which may be identical, are either an alkyl group with 1 to 4 carbon atoms, optionally substituted by a hydroxyl radical, or a phenyl group, optionally substituted by an alkyl radical with 1 to 9 carbon atoms, with the total number of carbon atoms in groups $R_5$, $R_6$, $R'_6$, and $R''_6$ being greater than 4 if A is oxygen.

Exemplary of such quaternary ammonium salts are the chloride of trimethylaminoethyl-acrylamide or the bromide of trimethylaminopropyl-acrylamide or -methacrylamide, the methylsulfate of trimethylaminobutyl-acrylamide or -methacrylamide, and the chloride of trimethylaminopropyl methacrylate.

In addition to quaternary ammonium salts, other representative unsaturated onium salts include unsaturated pyridinium, quinolinium, imidazolium and benzimidazolium salts. Specific examples of such onium salts are 1-methyl-2-vinylpyridinium bromide, 1-ethyl-2-vinylpyridinium chloride, 1-ethyl-2-vinylpyridinium methylsulfate, 1-benzyl-4-vinylpyridinium chloride, 1-methyl-2-vinyl-quinolinium iodide, N-vinyl-N'-methylimidazolium bromide, 1-vinyl-3-methylbenzimidazolium bromide, (2-methacryloxy)-dimethyl-sulfonium chloride, methyldiallylsulfonium methylsulfate and trimethylvinylphosphonium bromide.

The unsaturated tertiary nitrogen compound can be added to the reaction mixture during any stage of the polymerization of the non-ionic monomer(s). For example, the nitrogen compound can be added to the reaction mixture at the start of the polymerization process, continuously or discontinuously throughout the polymerization process, after at least about 30% of the non-ionic monomer has been converted to the synthetic polymer, or after polymerization, for example, when about 90-98% of the non-ionic monomer has been converted to the polymer. Thus, the reaction mixture can include a mixture of non-ionic monomers and polymerized non-ionic monomers.

The substance which generates cationic species can be added to the reaction mixture before or simultaneously with the unsaturated nitrogen compound. In addition, the substance can be present, at the start of the polymerization of the non-ionic monomer, in the reaction mixture in the form of a cationic seed, i.e., a polymer or copolymer previously prepared by aqueous emulsion polymerization, in a cationic medium, of the non-ionic monomer(s) in the presence of the desired amount of the substance which generates cationic charges.

The amount of substance which generates cationic species required and the amount of unsaturated tertiary nitrogen compound required depend upon the amount of non-ionic monomer used. For every 100 parts by weight of non-ionic monomer used, about 1 to 20, preferably 2 to 10, parts by weight of the substance which generates cationic species are used, and at least 4, preferably 4 to 15, parts by weight of the substance and the nitrogen compound, taken together, are used.

The copolymerization of the nitrogen compound with the non-ionic monomer is carried out under conventional aqueous emulsion polymerization conditions, at a temperature between about 60° and 90° C., preferably between about 75° and 85° C., at a pH of from 3 to 12, preferably from 5 to 9, in the presence of a cationic or non-ionic initiator (including excess cationic initiator) and optionally, in the presence of a cationic or non-ionic emulsifying agent, and as aforementioned, in the presence of the substance which generates cationic species. Those substances which may be used as the substance which generates cationic species may also be used as cationic initiators.

Examples of non-ionic initiators include (1) mineral or organic peroxides and hydroperoxides which are soluble in water or organic solvents and which generate non-charged free radicals, such as hydrogen peroxide, benzoyl peroxide, tert-butyl hydroperoxide, cumene hydroperoxide, tert-butyl perbenzoate, diisopropylbenzene peroxide and methyl ethyl ketone peroxide; (2) the redox systems obtained by combining the above peroxides or hydoperoxides with a reducing agent, such as ascorbic acid, sugars, polyvalent metal salts, sulfites, bisulfites, sulfoxalates, thiosulfates and bisulfites of sodium or calcium, and the formaldehyde-sulfoxylate of sodium or zinc; and (3) azo-aliphatic compounds with an azoacyclic group and at least one aliphatic carbon atom on each nitrogen atom, at least one of the carbon atoms being tertiary, such as azobisisobutyro-nitrile, 2,2'-azobis(2,4-dimethylvaleronitrile), and 2,2'-azobis (2,4-dimethyl-4-methoxyvaleronitrile).

Examples of non-ionic emulsifiers include polyethoxylated fatty alcohols, polyethoxylated alkylphenols, and polyethoxylated fatty acids.

Examples of cationic emulsifiers include decylammonium methylsulfate, N-ethyldodecyl ammonium bromide, cetylammonium chloride, cetylammonium bromide, stearylammonium bromide, cetyldimethylbenzylammonium bromide, N,N-dimethyldodecylammonium chloride, N-methyltridecylammonium iodide, and the chlorides, bromides, sulfates, methylsulfates or acetates of ethoxylated fatty amines.

The amount of initiator used in the copolymerization of the nitrogen compound and the non-ionic monomer depends on both the monomer used and the polymerization temperature and is generally about 0.1 to 5%, preferably about 0.1 to 2%, by weight, based on the total weight of monomer.

However, if the initiator is the primary or one of the primary constituents of the substance which generates cationic species, a proportional amount of additional initiator should be used.

The amount of cationic or non-ionic emulsifier required to stabilize the copolymer particles can be as much as 2% of the total weight of the monomer.

The zeta potential of the claimed aqueous cationic dispersions of synthetic polymers can vary from about +80 mV to +20 mV measured at a pH of from about 2 to 12.

The claimed cationic dispersions may be used as binders for coating paper, for finishing non-woven fabrics, and for coating metallic substrates.

The substances listed in this specification as exemplary constituents of the aqueous cationic dispersions of the claimed invention, and the following examples of the claimed process are illustrative and are not to be construed as limiting the invention delineated in the claims.

EXAMPLE 1

The polymerization process described below is carried out in an autoclave with 5 liter capacity and an anchor-type stirrer with a speed of 180 revolutions per minute.

866 g of deionized water, 7.5 g of cetyldimethylbenzylammonium bromide, 15 g of the chloride of trimethylaminopropylmethacrylamide and 15 g of dimethylaminopropylmethacrylamide are charged cold into the autoclave.

The temperature of the autoclave is raised to 75° C. 7.5 g of cationic initiator, 2,2'-azobis(2-amidinopropane) hydrochloride, and 50 g of deionized water are introduced simultaneously. 750 g of butyl acrylate, 660 g of styrene, and 60 g of dimethylaminopropylmethacrylamide are then added continuously at a constant rate over 5 hours.

The reaction is maintained at 75° C. for 4 hours. After a total reaction time of 9 hours, the reaction is stopped by cooling.

A stable crust-free latex with the following characteristics is obtained:

| pH | 7.2 |
|---|---|
| Amount of solids | 46.2% by weight |
| Brookfield viscosity (50 rpm) | 1,980 mPa/s |
| Mean particle diameter | 0.1μ |
| Number of grains | 126 ppm |

The number of grains is determined by sifting the grains through mesh screens 40 and 100μ wide, and adding the grain content from each sieve.

The cationic nature of the dispersion produced is proven by measuring the zeta potential as a function of the pH. A MARK II microelectrophoresis apparatus manufactured by RANK BROTHERS, is used to measure a dispersion with a 0.05% polymer concentration at 80 volts and 25° C.

The results of this measurement are as follows:

| pH | zeta potential in mV |
|---|---|
| 4 | +60 |
| 6 | +52 |
| 8 | +38 |
| 10 | +32 |

EXAMPLE 2

940 g of deionized water, 9.6 g of cetyldimethylbenzylammonium bromide, 9.6 g of the chloride of trimethylaminopropylmethacrylamide, 24 g of dimethylaminopropylmethacrylamide and 72 g of vinyl acetate are charged cold into an autoclave.

The temperature of the autoclave is raised to 80° C. 1,100 g of vinyl acetate, 9 g of 2,2'-azobis(2-amidinopropane) hydrochloride, 210 g of deionized water, and 3.6 g of sodium bicarbonate are introduced at a constant rate over 5 hours.

The reaction is maintained for 4 hours.

A stable crust-free latex with the following characteristics is obtained:

| pH | 5.2 |
|---|---|
| Amount of solids | 47.1% by weight |
| Brookfield viscosity (50 rpm) | 210 mPa/s |
| Mean particle diameter | 0.12μ |
| Number of grains | 305 ppm |

The zeta potential measurements are as follows:

| pH | zeta potential in mV |
| --- | --- |
| 4 | +52 |
| 6 | +48 |
| 8 | +30 |
| 10 | +22 |

EXAMPLE 3

866 g of deionized water, 7.5 g of cetyldimethylbenzylammonium bromide, 15 g of the chloride of trimethylaminopropylmethacrylamide, and 15 g of dimethylaminopropylmethacrylamide are charged cold into an autoclave.

The temperature of the autoclave is raised to 75° C. 7.5 g of 2,2'-azobis(2-amidinopropane) hydrochloride and 50 g of deionized water are introduced simultaneously. 1,410 g of styrene and 60 g of dimethylaminopropylmethacrylamide are then added continuously at a constant rate over 5 hours.

The reaction is maintained at 75° C. for 4 hours.

A stable crust-free latex with the following characteristics is obtained:

| | |
| --- | --- |
| pH | 7.8 |
| Amount of solids | 47.1% by weight |
| Brookfield viscosity (50 rpm) | 210 mPa/s |
| Mean particle diameter | 0.12μ |
| Number of grains | 182 ppm |

The zeta potential measurements are as follows:

| pH | zeta potential in mV |
| --- | --- |
| 4 | +58 |
| 6 | +64 |
| 8 | +45 |
| 10 | +24 |

EXAMPLE 4

866 g of deionized water, 7.5 g of cetyldimethylbenzylammonium bromide, and 15 g of the chloride of trimethylaminopropylmethacrylamide are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate, 690 g of styrene, and 45 g of dimethylaminopropylmethacrylamide are then added continuously at a constant rate over 5 hours.

The reaction is maintained at 75° C. for 4 hours.

A dispersion with the following characteristics is obtained:

| | |
| --- | --- |
| pH | 7.8 |
| Amount of solids | 46% by weight |
| Brookfield viscosity (50 rpm) | 70 mPa/s |
| Mean particle diameter | 0.1μ |
| Number of grains | 255 ppm |

The zeta potential measurements are as follows:

| pH | zeta potential in mV |
| --- | --- |
| 4 | +56 |
| 6 | +52 |
| 8 | +32 |
| 10 | +15 |

EXAMPLE 5

866 g of deionized water, 7.5 g of cetyldimethylbenzylammonium bromide, 15 g of the chloride of trimethylaminopropylmethacrylamide, and 45 g of tert-butylaminopropylmethacrylamide are charged cold into an autoclave.

The temperature of the autoclave was raised to 75° C. 7.5 g of 2,2'-azobis(2-amidinopropane) hydrochloride and 50 g of deionized water are introduced simultaneously. 750 g of butyl acrylate, 645 g of styrene, and 45 g of tert-butylaminopropylmethacrylamide are then added continuously at a constant rate over 5 hours.

The reaction is maintained at 75° C. for 4 hours.

A crust-free latex with the following characteristics is obtained:

| | |
| --- | --- |
| pH | 7.65 |
| Amount of solids | 41.5% by weight |
| Brookfield viscosity (50 rpm) | 70 mPa/s |
| Mean particle diameter | 0.1μ |
| Number of grains | 350 ppm |

The zeta potential measurements are as follows:

| pH | zeta potential in mV |
| --- | --- |
| 4 | +54 |
| 6 | +54 |
| 8 | +31 |
| 10 | +20 |

EXAMPLE 6

866 g of deionized water, 7.5 g of cetyldimethylbenzylammonium bromide, 15 g of the chloride of trimethylaminopropylmethacrylamide, and 45 g of tert-butylaminopropylmethacrylamide are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate and 690 g of styrene are then added continuously at a constant rate over 5 hours. The reaction is maintained at 75° C. for 4 hours.

A stable crust-free latex with the following characteristics is obtained:

| | |
| --- | --- |
| pH | 7.25 |
| Amount of solids | 46.8% by weight |
| Brookfield viscosity (50 rpm) | 1,540 mPa/s |
| Mean particle diameter | 0.1μ |
| Number of grains | 196 ppm |

The zeta potential measurements are as follows:

| pH | zeta potential in mV |
| --- | --- |
| 4 | +46 |
| 6 | +48 |
| 8 | +25 |

| pH | zeta potential in mV |
|---|---|
| 10 | +19 |

EXAMPLE 7

866 g of deionized water, 7.5 g of cetyldimethylbenzylammonium bromide, 15 g of the chloride of trimethylaminopropylmethacrylamide, 15 g of dimethylaminopropylmethacrylamide, 75 g of styrene, and 66 g of butyl acrylate are charged cold into an autoclave.

The temperature of the autoclave is raised to 75° C. 7.5 g of 2,2'-azobis(2-amidinopropane) hydrochloride and 50 g of deionized water are introduced simultaneously. After the exothermic reaction ends, (after about 30 minutes, corresponding to an 80% conversion level for the monomer), 594 g of butyl acrylate, 675 g of styrene, 60 g of dimethylaminopropylmethacrylamide, 15 g of 2,2'-azobis(amidinopropane) hydrochloride, and 420 g of deionized water, are introduced continuously at a constant rate over 5 hours.

The reaction is maintained at 75° C. for 4 hours. A dispersion with the following characteristics is obtained:

| | |
|---|---|
| pH | 7.8 |
| Amount of solids | 45.9% by weight |
| Brookfield viscosity (50 rpm) | 152 mPa/s |
| Mean particle diameter | 0.12μ |
| Number of grains | 155 ppm |

The zeta potential measurements are as follows:

| pH | zeta potential in mV |
|---|---|
| 4 | +62 |
| 6 | +58 |
| 8 | +36 |
| 10 | +28 |

EXAMPLE 8

866 g of deionized water, 7.5 g of cetyldimethylbenzylammonium bromide, 15 g of dimethylaminopropylmethacrylamide, 75 g of styrene and 66 g of butyl acrylate are charged cold into an autoclave.

The temperature of the autoclave is raised to 80° C. 15 g of 2,2'-azobis(2-amidinopropane) hydrochloride and 50 g of deionized water are introduced simultaneously. When the exothermic reaction ends, (about 30 minutes, corresponding to a conversion level of 90% for the monomer), 594 g of butyl acrylate, 705 g of styrene, 60 g of dimethylaminopropylmethacrylamide, 15 g of 2,2'-azobis(amidinopropane) hydrochloride, and 420 g of deionized water are added continuously at a constant rate over 5 hours.

The reaction is continued for 4 hours.

A stable crust-free latex with the following characteristics is obtained:

| | |
|---|---|
| pH | 7.6 |
| Amount of solids | 42.3% by weight |
| Brookfield viscosity (50 rpm) | 82 mPa/s |
| Mean particle diameter | 0.11μ |
| Number of grains | 190 ppm |

The zeta potential measurements are as follows:

| pH | zeta potential in mV |
|---|---|
| 4 | +48 |
| 6 | +36 |
| 8 | +32 |
| 10 | +19 |

EXAMPLE 9

866 g of deionized water, 30 g of the chloride of trimethylaminopropylmethacrylamide, 75 g of styrene, and 66 g of butyl acrylate are charged cold into an autoclave.

The temperature of the autoclave is raised to 75° C. 7.5 g of 2,2'-azobis(2-amidinopropane) hydrochloride and 50 g of deionized water are introduced simultaneously. When the exothermic reaction ends, (after about 30 minutes, corresponding to an 80% conversion level for the monomer), 594 g of butyl acrylate, 675 g of styrene, and 60 g of dimethylaminopropylmethacrylamide, 15 g of 2,2'-azobis(amidinopropane) hydrochloride, and 420 g of deionized water, are added continuously at a constant rate over 5 hours.

The reaction is maintained at 75° C. for 4 hours.

A stable crust-free latex with the following characteristics is obtained:

| | |
|---|---|
| pH | 7.9 |
| Amount of solids | 40.3% by weight |
| Brookfield viscosity (50 rpm) | 59 mPa/s |
| Mean particle diameter | 0.16μ |
| Number of grains | 420 ppm |

The zeta potential measurements are as follows:

| pH | zeta potential in mV |
|---|---|
| 4 | +66 |
| 6 | +52 |
| 8 | +38 |
| 10 | +22 |

EXAMPLE 10

866 g of deionized water, 7.5 g of cetyldimethylbenzylammonium bromide, and 15 g of the chloride of trimethylaminopropylmethacrylamide are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate and 660 g of styrene are then added continuously at a constant rate over 5 hours.

The reaction is maintained at 75° C. for 4 hours at which time the level of conversion is 90%. 75 g of dimethylaminopropylmethacrylamide are then added over 1 hour.

After a total reaction time of 12h30, the reaction is stopped by cooling.

A stable crust-free latex with the following characteristics is obtained:

| pH | 7.9 |
|---|---|
| Amount of solids | 46.3% |
| Brookfield viscosity (50 rpm) | 453 mPa/s |
| Mean particle diameter | 0.12μ |
| Number of grains | 485 ppm |

The zeta potential measurements are as follows:

| pH | zeta potential in mV |
|---|---|
| 4 | +58 |
| 6 | +49 |
| 8 | +31 |
| 10 | +23 |

EXAMPLE 11

The process of Example 7 is repeated, but the 15 g of the chloride of trimethylaminopropylmethacrylamide are replaced by 15 g of 1-methyl-2-vinylpyridinium chloride.

A latex with the following characteristics is obtained:

| pH | 7.8 |
|---|---|
| Amount of solids | 45.8% |
| Brookfield viscosity (50 rpm) | 116 mPa/s |
| Mean particle diameter | 0.1μ |
| Number of grains | 475 ppm |

The zeta potential measurements are as follows:

| pH | zeta potential in mV |
|---|---|
| 4.5 | +48 |
| 6 | +42 |
| 8 | +26 |
| 10 | +19 |

EXAMPLE 12

The process of Example 4 is repeated, but the 45 g of dimethylaminopropylmethacrylamide are replaced by 45 g of ditertbutylaminopropylmethacrylate.

A latex with the following characteristics is obtained:

| pH | 8.2 |
|---|---|
| Amount of solids | 46.5% |
| Brookfield viscosity (50 rpm) | 128 mPa/s |
| Mean particle diameter | 0.11μ |
| Number of grains | 360 ppm |

The zeta potential measurements are as follows:

| pH | zeta potential in mV |
|---|---|
| 4 | +38 |
| 6 | +36 |
| 8 | +20 |
| 10 | +18 |

EXAMPLE 13

866 g of deionized water, 7.5 g of cetyldimethylbenzylammonium bromide, 30 g of 1-methyl-2-vinylpyridinium chloride, and 30 g of dimethylaminopropylmethacrylamide are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate, 630 g of styrene, and 60 g of dimethylaminopropylmethacrylamide are then added continuously at a constant rate over 5 hours.

The reaction is maintained at 75° C. for 4 hours. After a total reaction time of 9 hours, the reaction is stopped by cooling.

A stable crust-free latex with which has the following characteristics is obtained:

| pH | 8.5 |
|---|---|
| Amount of solids | 47.2% by weight |
| Brookfield viscosity (50 rpm) | 270 mPa/s |
| Mean particle diameter | 0.12μ |
| Number of grains | 215 ppm |

The zeta potential measurements are as follows:

| pH | zeta potential in mV |
|---|---|
| 4 | +68 |
| 6 | +66 |
| 8 | +44 |
| 10 | +26 |

EXAMPLE 14

866 g of deionized water, 162.3 g of the latex produced in Example 1, which had about 75 g of solids, and 15 g of the chloride of trimethylaminopropylmethacrylamide, are charged cold into an autoclave.

The temperature of the autoclave is raised to 75° C. 7.5 g of 2,2'-azobis(2-amidinopropane) hydrochloride and 50 g of deionized water are introduced simultaneously. 750 g of butyl acrylate, 675 of styrene, and 60 g of dimethylaminopropylmethacrylamide are then added continuously at a constant rate over 5 hours.

The reaction is maintained at 75° C. for 4 hours. After a total reaction time of 9 hours, the reaction is stopped by cooling.

A latex with the following characteristics is obtained:

| pH | 7.5 |
|---|---|
| Amount of solids | 44.6% |
| Brookfield viscosity (50 rpm) | 288 mPa/s |
| Mean particle diameter | 0.22μ |
| Number of grains | 405 ppm |

The zeta potential measurements are as follows:

| pH | zeta potential in mV |
|---|---|
| 4 | +48 |
| 6 | +36 |
| 8 | +20 |
| 10 | +18 |

I claim:
1. Aqueous cationic dispersion of synthetic polymers obtained by reacting:
   (a) at least one unsaturated tertiary nitrogen compound not capable of being hydrolyzed in an acid or alkaline medium, with

(b) a cationic aqueous emulsion reaction mixture, containing:
  (i) at least one non-ionic monomer capable of being copolymerized with said unsaturated nitrogen compound to form synthetic polymers,
  (ii) at least one unsaturated salt of a polycoordinated onium of a Group 5a or 6a element capable of copolymerizing with said monomers,
  (iii) a cationic or non-ionic polymerization initiator, and
  (iv) a cationic or non-ionic emulsifier.

2. The aqueous cationic dispersions of claim 1 wherein said reaction mixture includes a mixture of non-ionic monomers and polymerized non-ionic monomers.

3. Aqueous cationic dispersions of synthetic polymers obtained by reacting:
(a) at least one unsaturated tertiary nitrogen compound selected from the group consisting of
  (i) an N-(ω-dialkylaminoalkyl)amide of an unsaturated carboxylic acid, having the formula:

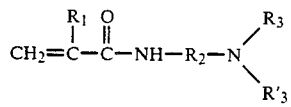

where $R_1$ is a hydrogen atom or a $C_1$–$C_4$ alkyl group, $R_2$ is a $C_1$–$C_{12}$ alkylene group, and $R_3$ and $R'_3$ are either $C_1$–$C_6$ alkyl groups, or phenyl radicals, optionally substituted by a $C_1$–$C_9$ alkyl radical,
  (ii) an unsaturated aminoester having the formula:

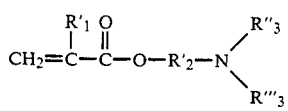

where $R'_1$ is a $C_1$–$C_5$ alkyl group, $R'_2$ is a linear or branched alkylene group with at least two carbon atoms, and $R''_3$ and $R'''_3$, which may be identical, are either a $C_1$–$C_6$ alkyl group, optionally substituted by a hydroxyl radical, or a phenyl group, optionally substituted by a $C_1$–$C_9$ alkyl radical, wherein the total number of carbon atoms contained in the radicals $R'_2$, $R''_3$, and $R'''_3$ must be greater than 8, and
  (iii) an heterocyclic nitrogen compound with a nitrogen or carbon atom substituted by a vinyl group, with
(b) a cationic aqueous emulsion reaction mixture, containing:
  (i) at least one non-ionic monomer selected from the group consisting of vinylaromatic compounds, vinyl esters, ethylenic nitriles, ethylenic carboxylic esters, dialkyl esters of ethylenic dicarboxylic acids, ethylenic amides, and N-substituted derivatives of ethylenic amides, and
  (ii) at least one unsaturated salt of a polycoordinated onium of a Group 5a or 6a element capable of copolymerizing with said monomers, and
  (iii) a cationic or non-ionic polymerization initiator, and
  (iv) a cationic or non-ionic emulsifier.

4. The aqueous cationic dispersions of claim 3 in which said unsaturated tertiary nitrogen compound is N-(ω-dialkylaminoalkyl)amide and $R_1$ is a $C_1$–$C_2$ alkyl group, $R_2$ is a $C_1$–$C_8$ alkylene group, and $R_3$ and $R'_3$ are $C_1$–$C_4$ alkyl groups.

5. The aqueous cationic dispersions of claim 4 wherein said N-(ω-dialkylaminoalkyl)amide is selected from the group consisting of dimethylaminomethyl-acrylamide or -methacrylamide and dimethylaminoethyl-acrylamide or -methacrylamide.

6. The aqueous cationic dispersions of claim 3 in which said unsaturated tertiary nitrogen compound is an unsaturated amino ester and $R'_1$ is a $C_1$–$C_2$ alkyl group, $R'_2$ is a linear or branched $C_2$–$C_{12}$ alkylene group, and $R''_3$ and $R'''_3$ are $C_1$–$C_4$ alkyl groups, with the total number of carbon atoms in the radicals $R'_2$, $R''_3$, and $R'''_3$ being greater than or equal to 10.

7. The aqueous cationic dispersions of claim 6 wherein said unsaturated aminoester is selected from the group consisting of di-tert-butylaminoethyl methacrylate, di-tert-butylaminopropyl methacrylate, and dipentylaminoethyl methacrylate.

8. The aqueous cationic dispersions of claim 3 wherein said unsaturated salt of a polycoordinated onium is an unsaturated quaternary ammonium salt having the formula:

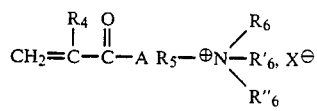

where X— is Cl—, Br—, I—, $SO_4H$—, $SO_4$——, $CH_3SO_4$—, $C_2H_5SO_4$— or $CH_3COO$—, $R_4$ is a hydrogen atom or a methyl-group, A is an oxygen atom or an —NH— group, $R_5$ is a linear or branched alkylene group with 1 to 18 carbon atoms, and $R_6$, $R'_6$, and $R''_6$, which may be identical, are either an alkyl group with 1 to 4 carbon atoms, optionally substituted by a hydroxyl radical, or a phenyl group optionally substituted by an alkyl radical with 1 to 9 carbon atoms, wherein the total number of carbon atoms in groups $R_5$, $R_6$, $R'_6$ and $R''_6$, is greater than 4 if A is oxygen.

9. The aqueous cationic dispersions of claim 8, wherein said ammonium salt is selected from the group consisting of the chloride of trimethylaminoethyl-acrylamide, the bromide of trimethylaminopropyl-acrylamide or -methacrylamide, the methylsulfate of trimethylaminobutyl-acrylamide or -methacrylamide, and the chloride of trimethylaminopropyl methacrylate.

10. The aqueous cationic dispersions of claim 3, wherein said unsaturated salt is selected from the group consisting of unsaturated pyridinium, quinolinium, imidazolium, and benzimidazolium salts.

11. The aqueous cationic dispersions of claim 3, wherein a cationic seed, comprising a polymer or copolymer prepared by aqueous emulsion polymerization, in a cationic medium, of said at least one non-ionic monomer in the presence of said unsaturated salt of a polycoordinated onium, is present in said reaction mixture at the start of the polymerization of said non-ionic monomers.

12. The aqueous dispersions of claim 3 wherein said unsaturated salt and said polymerization initiator are added to said reaction mixture before or simultaneously with said unsaturated tertiary nitrogen compound.

13. The aqueous cationic dispersions of claim 3 wherein for every 100 parts by weight of non-ionic monomers used, about 1 to 20 parts by weight of said unsaturated salt and said polymerization initiator, taken together, are used, and at least 4 parts by weight of said unsaturated salt, said polymerization initiator and said unsaturated tertiary nitrogen compound, taken together, are used.

14. The aqueous cationic dispersions of claim 13 wherein for every 100 parts by weight of said non-ionic monomer used, about 2 to 10 parts by weight of said unsaturated salt and said polymerization initiator, taken together, are present, and a total of about 4 to 15 parts by weight of said unsaturated salt, said polymerization initiator and said unsaturated tertiary nitrogen compound, taken together, are used.

15. The aqueous cationic dispersions of claim 3 wherein the polymerization temperature of said non-ionic monomer is between about 60° C. and 90° C., and the pH is from 3 to 12.

16. A composition capable of forming aqueous cationic dispersions of synthetic polymers, said composition comprising:
  (a) at least one unsaturated tertiary nitrogen compound not capable of being hydrolyzed in an acid or alkaline medium, and
  (b) a cationic aqueous emulsion reaction mixture, containing:
    (i) at least one non-ionic monomer capable of being copolymerized with said nitrogen compounds to form synthetic polymers,
    (ii) at least one unsaturated salt of a polycoordinated onium of a Group 5a or 6a element capable of copolymerizing with said monomers,
    (iii) a cationic or non-ionic polymerization initiator, and
    (iv) a cationic or non-ionic emulsifier.

17. The composition of claim 16 wherein said unsaturated tertiary nitrogen compound is an N-(ω-dialkylaminoalkyl)amide of an unsaturated carboxylic acid having the formula:

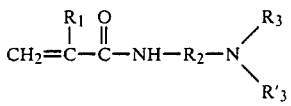

where $R_1$ is a hydrogen atom or a $C_1$-$C_4$ alkyl group, $R_2$ is a $C_1$-$C_{12}$ alkylene group, and $R_3$ and $R'_3$ are either $C_1$-$C_6$ alkyl groups or phenyl radicals, optionally substituted by a $C_1$-$C_9$ alkyl radical.

18. The composition of claim 16 in which said unsaturated tertiary nitrogen compound is an N-(ω-dialkylaminoalkyl)amide and $R_1$ is a $C_1$-$C_2$ alkyl group, $R_2$ ia a $C_1$-$C_8$ alkylene group, and $R_3$ and $R'_3$ are $C_1$-$C_4$ alkyl groups.

19. The composition of claim 18 wherein said N-(107-dialkylaminoalkyl)amide is selected from the group consisting of dimethylaminomethyl-acrylamide or -methacrylamide and dimethylaminoethyl-acrylamide or -methacrylamide.

20. The composition of claim 16 wherein said unsaturated tertiary nitrogen compound is an unsaturated aminoester of the formula:

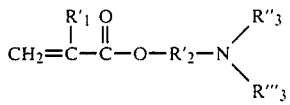

where $R'_1$ is a $C_1$-$C_5$ alkyl group, $R'_2$ is a linear or branched alkylene group with at least two carbon atoms, and $R''_3$ and $R'''_3$, which may be identical, are either a $C_1$-$C_6$ alkyl group, optionally substituted by a hydroxyl radical, or a phenyl group, optionally substituted by $C_1$-$C_9$ alkyl radical, wherein the total number of carbon atoms contained in the radicals $R'_2$, $R''_3$, and $R'''_3$ must be greater than 8.

21. The composition of claim 16 wherein said unsaturated tertiary nitrogen compound is an unsaturated aminoester and $R_1$ is a $C_1$-$C_2$ alkyl group, $R_2$ is a linear or branched $C_2$-$C_{12}$ alkylene group, and $R''_3$ and $R'''_3$ are $C_1$-$C_4$ alkyl groups, with the total number of carbon atoms in the radicals $R'_2$, $R''_3$, and $R'''_3$ being greater than or equal to 10.

22. The composition of claim 20 wherein said unsaturated aminoester is selected from the group consisting of di-tert-butylaminoethyl methacrylate, di-tert-butylaminopropyl methacrylate, and dipentylaminoethyl methacrylate.

23. The composition of claim 16 wherein said unsaturated tertiary nitrogen compound is a heterocyclic nitrogen compound with a nitrogen or carbon atom substituted by a vinyl group.

24. The composition of claim 16 wherein said non-ionic monomer is selected from the group consisting of vinylaromatic compounds, vinyl esters, ethylenic nitriles, ethylenic carboxylic esters, dialkyl esters of ethylenic dicarboxylic acids, ethylenic amides, and the N-substituted derivatives of ethylenic amides.

25. The composition of claim 16 wherein said unsaturated salt is an unsaturated quaternary ammonium salt having the formula: where $X^-$ is $Cl^-$, $Br^-$, $I^-$, $SO_4H^{31}$, $SO_4^{--}$, $CH_3SO_4^-$, $C_2H_5SO_4^-$ or $CH_3COO^{31}$, $R_4$ is a hydrogen atom or a methyl-group, A is an oxygen atom or an —NH— group, $R_5$ is a linear or branched alkylene group with 1 to 18 carbon atoms, and $R_6$, $R'_6$, and $R''_6$, which may be identical, are either an alkyl group with 1 to 4 carbon atoms, optionally substituted by a hydroxyl radical, or a phenyl group optionally substituted by an alkyl radical with 1 to 9 carbon atoms, wherein the total number of carbon atoms in groups $R_5$, $R_6$, $R'_6$ and $R''_6$, is greater than 4 if A is oxygen.

26. The composition of claim 25, wherein said ammonium salt is selected from the group consisting of the chloride of trimethylaminoethyl-acrylamide, the bromide of trimethylamino-propyl-acrylamide or -methacrylamide, the methylsulfate of trimethylaminobutyl-acrylamide or -methacrylamide, and the chloride of trimethylaminopropyl methacrylate.

27. The composition of claim 16, wherein said unsaturated salt is selected from the group consisting of unsaturated pyridinium, quinolinium, imidazolium, and benzimidazolium salts.

28. A process for making aqueous cationic dispersions of synthetic polymers comprising the steps of:
  (a) providing at least one unsaturated tertiary nitrogen compound not capable of being hydrolyzed in an acid or alkaline medium; and
  (b) reacting with said unsaturated tertiary nitrogen compound a cationic aqueous emulsion reaction mixture, containing:
    (i) at least one non-ionic monomer capable of being copolymerized with said non-hydrolyzable nitrogen compound to form synthetic polymers, and (ii) at least one unsaturated salt of a polycoordinated onium of a Group 5a or 6a element capable of copolymerizing with said monomers, (iii) a cationic or non-ionic polymerization initiator, and (iv) a cationic or non-ionic emulsifier.

29. The process according to claim 28 wherein said unsaturated tertiary nitrogen compound is added to said reaction mixture during any stage of the polymerization of said non-ionic monomer.

30. The process according to claim 28 wherein said unsaturated salt and said polymerization initiator are added to said reaction mixture before or simultaneously with said unsaturated tertiary nitrogen compound.

31. The process according to claim 28 wherein a cationic seed, comprising a polymer or copolymer prepared by aqueous emulsion polymerization, in a cationic medium, of said at least one non-ionic monomer in the presence of said unsaturated salt of a polycoordinated onium, is present in said reaction mixture at the start of the polymerization of said non-ionic monomer(s).

32. A process for making aqueous cationic dispersions of synthetic polymers comprising the steps of:

(a) providing at least one unsaturated tertiary nitrogen compound selected from the group consisting of (i) an N-(ω-dialkylaminoalkyl)amide of an unsaturated carboxylic acid, having the formula:

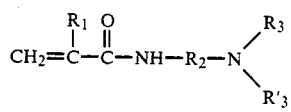

where $R_1$ is a hydrogen atom or a $C_1$–$C_4$ alkyl group, $R_2$ is a $C_1$–$C_{12}$ alkylene group, and $R_3$ and $R'_3$ are either $C_1$–$C_6$ alkyl groups or phenyl radicals, optionally substituted by a $C_1$–$C_9$ alkyl radical, (ii) an unsaturated aminoester having the formula:

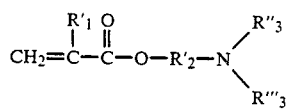

where $R'_1$ is a $C_1$–$C_5$ alkyl group, $R'_2$ is a linear or branched alkylene group with at least two carbon atoms, and $R''_3$ and $R'''_3$, which may be identical, are either a $C_1$–$C_6$ alkyl group, optionally substituted by a hydroxyl radical, or a phenyl group, optionally substituted by a $C_1$–$C_9$ alkyl radical, wherein the total number of carbon atoms contained in the radicals $R'_2$, $R''_3$, and $R'''_3$ must be greater than 8, and (iii) a heterocyclic nitrogen compound with a nitrogen or carbon atom substituted by a vinyl group;

(b) reacting with said unsaturated tertiary nitrogen compound a cationic aqueous emulsion reaction mixture, containing:

(i) at least one non-ionic monomer selected from the group consisting of vinylaromatic compounds, vinyl esters, ethylenic nitriles, ethylenic carboxylic esters, dialkyl esters of ethylenic dicarboxylic esters, dialkyl esters of ethylenic dicarboxylic acids, ethylenic amides, and N-substituted derivatives of ethylenic amides, and (ii) at least one unsaturated salt of a polycoordinated onium of a Group 5a or 6a element capable of copolymerizing with said monomers, (iii) a cationic or non-ionic polymerization initiator, and (iv) a cationic or non-ionic emulsifier.

33. The process according to claim 32 in which said unsaturated tertiary nitrogen compound is N-(ω-dialkylaminoalkyl)amide and $R_1$ is a $C_1$–$C_2$ alkyl group, $R_2$ is a $C_1$–$C_8$ alkylene group, and $R_3$ and $R'_3$ are $C_1$–$C_4$ alkyl groups.

34. The process according to claim 33 wherein said N-(ω-dialkylaminoalkyl)amide is selected from the group consisting of dimethylaminomethyl-acrylamide or -methacrylamide and dimethylaminoethyl-acrylamide or -methacrylamide.

35. The process according to claim 32 in which said unsaturated tertiary nitrogen compound is an unsaturated amino ester and $R'_1$ is a $C_1$–$C_2$ alkyl group, $R'_2$ is a linear or branched $C_2$–$C_{12}$ alkylene group, and $R''_3$ and $R'''_3$ are $C_1$–$C_4$ alkyl groups, with the total number of carbon atoms in the radicals $R'_2$, $R''_3$, and $R'''_3$ being greater than or equal to 10.

36. The process according to claim 35 wherein said unsaturated aminoester is selected from the group consisting of di-tert-butylaminoethyl methacrylate, di-tert-butylaminopropyl methacrylate, and dipentylaminoethyl methacrylate.

37. The process according to claim 32 wherein said unsaturated salt is an unsaturated quaternary ammonium salt having the formula:

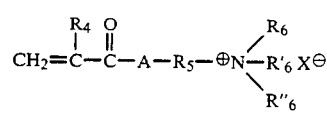

where $X^-$ is $Cl^-$, $Br^-$, $I^-$, $SO_4H^-$, $SO_4^{--}$, $CH_3SO_4^-$, $C_2H_5SO_4^-$ or $CH_3COO^-$, $R_4$ is a hydrogen atom or a methyl-group, A is an oxygen atom or an —NH— group, $R_5$ is a linear or branched alkylene group with 1 to 18 carbon atoms, and $R_6$, $R'_6$, and $R''_6$, which may be identical, are either an alkyl group with 1 to 4 carbon atoms, optionally substituted by a hydroxyl radical, or a phenyl group optionally substituted by an alkyl radical with 1 to 9 carbon atoms, wherein the total number of carbon atoms in groups $R_5$, $R_6$, $R'_6$ and $R''_6$, is greater than 4 if A is oxygen.

38. The process according to claim 37, wherein said ammonium salt is selected from the group consisting of the chloride of trimethylaminoethyl-acrylamide, the bromide of trimethylaminopropyl-acrylamide or -methacrylamide, the methylsulfate of trimethylaminobutyl-acrylamide or -methacrylamide, and the chloride of trimethylaminopropyl methacrylate.

39. The process according to claim 32, wherein said unsaturated salt is selected from the group consisting of unsaturated pyridinium, quinolinium, imidazolium, and benzimidazolium salts.

40. The process according to claim 32, wherein a cationic seed, comprising a polymer or copolymer prepared by aqueous emulsion polymerization, in a cationic medium, of said at least one non-ionic monomer in the presence of said unsaturated salt of a polycoordinated onium, is present in said reaction mixture at the start of the polymerization of said non-ionic monomers.

41. The process according to claim 32 wherein said unsaturated salt and said polymerization initiator are added to said reaction mixture before or simultaneously with said nitrogen compound.

42. The process according to claim 32 wherein for every 100 parts by weight of said non-ionic monomers used, about 1 to 20 parts by weight of said unsaturated salt and said polymerization initiator, taken together, are used, and at least 4 parts by weight of said unsaturated salt, said polymerization initiator and said unsaturated tertiary nitrogen compound, taken together, are used.

43. The process according to claim 32 wherein for every 100 parts by weight of said non-ionic monomer used, about 2 to 10 parts by weight of said unsaturated salt and said polymerization initiator, taken together, are present, and a total of about 4 to 15 parts by weight of said unsaturated salt, said polymerization initiator and said unsaturated tertiary nitrogen compound, taken together, are used.

44. The process according to claim 32 wherein the polymerization temperature of said non-ionic monomer is between about 60° C. and 90° C. and, the pH is from 3 to 12.

45. A binder containing an aqueous cationic dispersion of claim 1.

46. A binder containing an aqueous cationic dispersion of claim 3.

* * * * *